May 24, 1966  A. G. AYOUB  3,253,114
WELDING OF STUDS AND THE LIKE
Filed Jan. 17, 1963

3,253,114
WELDING OF STUDS AND THE LIKE
Ayoub G. Ayoub, % Gindy Ayoub, 5 Zaghlool St., off Idris Raghib St., Dahir, Cairo, United Arab Republic
Filed Jan. 17, 1963, Ser. No. 252,201
Claims priority, application Great Britain, Feb. 5, 1962, 4,274/62
3 Claims. (Cl. 219—99)

This invention relates to the welding of metallic studs to metallic plates or other structures or components by the usual stud welding electrical process and has for its object to improve the mechanical properties and the fatigue strength of the plate, structure or component at about the part to which the stud is welded. A stud welding operation has a deteriorating effect on the mechanical and fatigue properties of the metal components to which the stud is welded.

The invention consists in a method of improving the strength of the part to which the stud is welded by applying local compression loads to the plate or like surface around the root of the stud after the welding operation.

The invention further comprises the arrangement of a hollow cylindrical die around the stud and abutting against the surface of the plate or the like, with means for loading the die by static or impact means to produce a pressure on the plate or like surface which will cause the die to indent the plate around the welded end of the stud.

In carrying the invention into effect, the die may be made from high carbon high chrome alloy steel and may be statically loaded by a load of a magnitude big enough to produce a pressure on the plate surface of about three times the yield stress of the plate material, i.e. load=3 times the yield stress of the plate × projected area of indenting face of the die.

Referring to the accompanying explanatory drawings.

Figure 1:
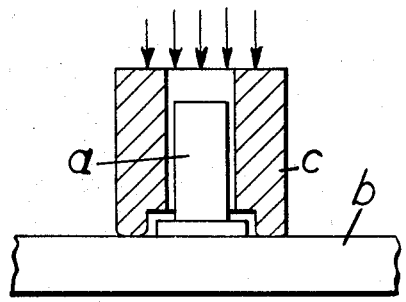
FIGURE 1 shows a stud $a$ which is being electrically welded to a plate $b$, there being a hollow cylindrical die $c$ around the stud which is adapted to be loaded by static or impact means to produce pressure on the plate around the welded end of the stud in accordance with the present invention.
Figure 2:
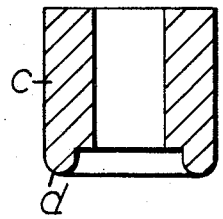
FIGURE 2 shows a modified form of the end $d$ of the hollow cylindrical die $c$ which is to be in contact with the plate.

The operative end of the cylindrical die $c$ may be varied in shape to meet requirements.

If the loading of the die is by impact, drop weights may be applied to the top of the die, or alternatively the die top can be hammered to produce the same effect.

The profile of the indenting face of the die may be of any desired form. It may, for example, be circular, elliptical or flat with fillets at each side.

What I claim is:

1. In the welding of metallic studs to surfaces of metallic plates by the usual stud welding electrical process, the process of improving the strength of the weld compressing the steps of locating a hollow cylindrical die around the stud and on the surface of the plate around the weld and applying a force to the die to indent only the surface around the stud when the surface is approximately at atmospheric temperature and thereby apply local compression forces to the plate, said applied force being sufficient to produce a compressive stress in the plate not appreciably less than three times the yield stress of the plate material.

2. In the process of claim 1 applying said force by means of a static load on the die.

3. In the process of claim 1 applying said force by means of an impact on the die.

References Cited by the Examiner
UNITED STATES PATENTS

| | | | |
|---|---|---|---|
| 2,412,175 | 12/1946 | Ridgway | 219—91 |
| 2,491,479 | 12/1949 | Dash | 219—99 X |
| 2,766,517 | 10/1956 | Ericson | 29—480 |
| 3,025,374 | 3/1962 | McCoy | 219—128 X |

FOREIGN PATENTS 215,374  6/1958  Australia.

OTHER REFERENCES

"Welding Handbook," 3rd ed., Am. Welding Soc., New York, N.Y., p. 1,008, TS227, A5h, 1950.

"Effect of Peening . . . Welds," O. H. Henry et al., "Welding Journal," April 1944, pp. 206S–208S.

ANTHONY BARTIS, *Acting Primary Examiner.*

RICHARD M. WOOD, *Examiner.*

R. F. STAUBLY, *Assistant Examiner.*